(12) United States Patent
Weinert

(10) Patent No.: US 7,231,124 B2
(45) Date of Patent: *Jun. 12, 2007

(54) FRAME HAVING OFFSET INNER DOOR SECTION

(75) Inventor: Stephen J. Weinert, Arlington, TX (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/588,142

(22) Filed: Oct. 26, 2006

(65) Prior Publication Data

US 2007/0041694 A1  Feb. 22, 2007

Related U.S. Application Data

(63) Continuation of application No. 10/887,008, filed on Jul. 8, 2004, now Pat. No. 7,146,088.

(51) Int. Cl.
  *G02B 6/00* (2006.01)
(52) U.S. Cl. .................. 385/134; 385/135; 385/136; 385/137; 385/138
(58) Field of Classification Search ........ 385/134–137, 385/147; 361/652; 312/324
  See application file for complete search history.

(56) References Cited

U.S. PATENT DOCUMENTS

| | | | |
|---|---|---|---|
| 4,708,430 A | 11/1987 | Donaldson et al. | ......... 385/134 |
| 5,152,596 A | 10/1992 | Raleigh | |
| 5,274,731 A | 12/1993 | White | |
| 5,283,646 A | 2/1994 | Bruder | |
| 5,459,808 A | 10/1995 | Keith | ........................ 385/135 |
| 5,886,868 A | 3/1999 | White et al. | |
| 6,175,079 B1 | 1/2001 | Johnston et al. | .............. 174/50 |
| 6,236,795 B1 | 5/2001 | Rodgers | |
| 6,353,696 B1 | 3/2002 | Gordon et al. | |
| 6,396,990 B1 | 5/2002 | Ehn et al. | |
| 6,504,094 B2 | 1/2003 | Woo et al. | ..................... 174/50 |
| 6,515,227 B1 | 2/2003 | Massey et al. | ................ 174/50 |
| 6,591,053 B2 | 7/2003 | Fritz | .......................... 385/135 |
| 6,631,237 B2 | 10/2003 | Knudsen et al. | |
| 6,728,461 B1 | 4/2004 | Senatore et al. | |
| 6,920,274 B2 * | 7/2005 | Rapp et al. | ................. 385/135 |
| 6,980,725 B1 | 12/2005 | Swieconek | |
| 7,031,588 B2 | 4/2006 | Cowley et al. | |
| 7,046,899 B2 | 5/2006 | Colombo et al. | |
| 7,146,088 B2 * | 12/2006 | Weinert | ...................... 385/134 |
| 2001/0036351 A1 | 11/2001 | Fritz | .......................... 385/135 |

* cited by examiner

*Primary Examiner*—Brian Healy
*Assistant Examiner*—Guy G. Anderson
(74) *Attorney, Agent, or Firm*—Brooks Kushman P.C.

(57) ABSTRACT

A frame includes a cabinet, a door, and a bracket. The cabinet has an opened front face. The door has a door frame and an inner door section. The door frame is connected to the cabinet for the door to open and close relative to the front face of the cabinet. The bracket connects the inner door section to the door frame such that the inner door section is offset from the front face of the cabinet by a separation distance and covers the front face of the cabinet from the separation distance when the door is closed. The bracket has a sufficient length such that the separation distance between the inner door section and the front face of the cabinet when the door is closed permits fiber optic components to extend through the front face of the cabinet without being compressed by the inner door section.

20 Claims, 3 Drawing Sheets

FRAME HAVING OFFSET INNER DOOR SECTION

CROSS-REFERENCE TO RELATED APPLICATIONS

This application is a continuation of U.S. application Ser. No. 10/887,008, filed Jul. 8, 2004, now U.S. Pat. No. 7,146,088, which is hereby incorporated by reference in its entirety.

BACKGROUND OF THE DISCLOSURE

1. Field of the Disclosure

The present disclosure generally relates to fiber distribution frames.

2. Background Art

A fiber distribution frame serves as the primary interface between outside plant fiber optic facilities entering a central office structure and the fiber optic equipment installed within that same location. The fiber distribution frame provides a centralized point for the organization and administration of the fiber optic facility and intra-building fiber equipment cables; provides a flexible platform for future fiber growth; and provides re-configurable connections between any two terminations or appearances.

In its most basic form, a fiber distribution frame is a housing, cabinet, enclosure, etc., which houses fiber optic components or portions of fiber optic components. Fiber optic components include fiber optic cables, fiber optic jumpers, fiber optic strands, fiber optic connectors, etc. In general, fiber optic components extend into and out of the fiber distribution frame. The fiber distribution frame has connecting panels and the like for enabling the incoming and exiting fiber optic components to be selectively cross-connected together.

A fiber distribution frame includes a door which is connected by a hinge or the like to the front-side of the frame. The door opens and shuts in order to provide and limit access to the fiber optic components housed within the fiber distribution frame. When shut, the door functions to shield the fiber optic components from the outside environment and from inadvertent or unauthorized access by human personnel. It is desired to limit access to fiber optic components communicating optical signals having high laser output power.

A problem occurs when the door is shut too close to the fiber optic components placed within the front-side area of the fiber distribution frame and actually touches or contacts portions of these components. The contacted fiber optic component portions will be compressed somewhat during contact with the door and if the door is shut too close then the door will compress the contacted portions to a large extent. For example, the contacted portions of the fiber optic components may be bent at an immediate 90° angle.

Fiber optic components require a minimum bend radius to function properly. That is, fiber optic components cannot be bent past the minimum bend radius in order for the components to function properly. A bend radius in a fiber optic component less than the minimum bend radius may cause the component to unduly attenuate an optical signal transmitted by the component thereby resulting in loss of signal strength. If the fiber optic component is bent to a large extent, the component may experience fracture thereby requiring replacement by another component.

DETAILED DESCRIPTION OF THE PREFERRED EMBODIMENT(S)

Figure 1:
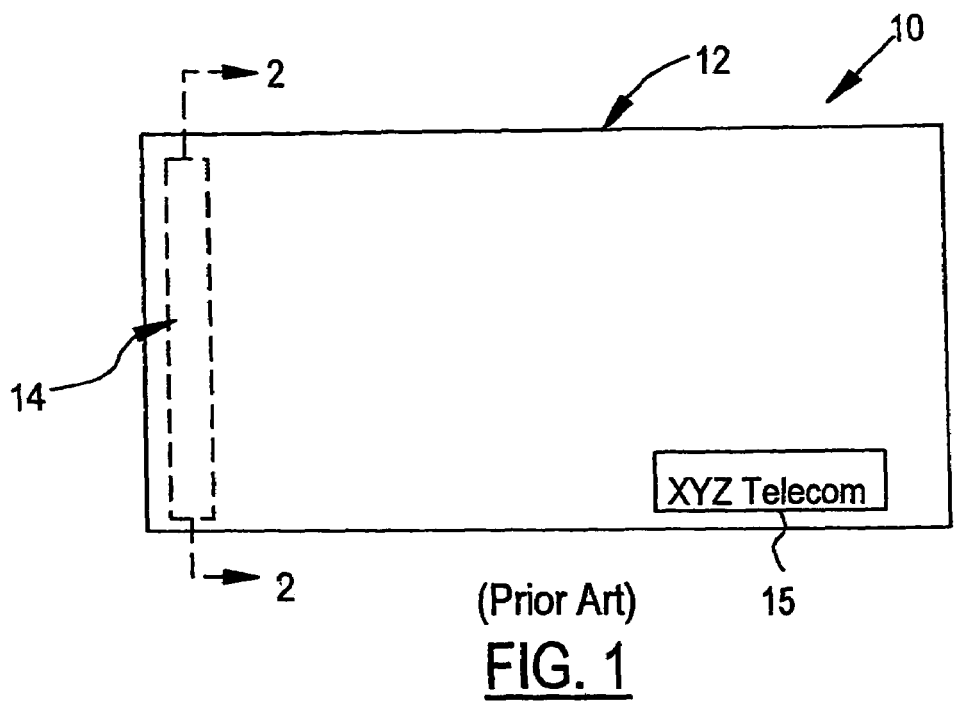
FIG. 1 illustrates a frontal view of the door of a typical fiber distribution frame.

The present disclosure discloses an embodiment of a frame having a cabinet, a door, and a bracket. The cabinet has an opened front face. The door has a door frame and an inner door section. The door frame is connected to the cabinet for the door to open and close relative to the front face of the cabinet. The bracket connects the inner door section to the door frame such that the inner door section is offset from the front face of the cabinet by a separation distance and covers the front face of the cabinet from the separation distance when the door is closed. The bracket has a sufficient length such that the separation distance between the inner door section and the front face of the cabinet when the door is closed permits fiber optic components to extend through the front face of the cabinet without being compressed by the inner door section.

The present disclosure discloses an embodiment of a frame having a cabinet, a door, brackets, and a router. The cabinet has an opened front face. The door has a door frame and an inner door section. The door frame is connected to the cabinet for the door to open and close relative to the front face of the cabinet. The door frame surrounds an opened area which exposes the front face of the cabinet when the door is closed for fiber optic components to extend out from the front face of the cabinet to outside of the cabinet. The brackets connect the inner door section to the door frame such that the inner door section is offset from the front face of the cabinet by a separation distance and covers the front face of the cabinet from the separation distance when the door is closed. The brackets have a sufficient length such that the separation distance between the inner door section and the front face of the cabinet permits fiber optic components to extend out from the front face of the cabinet to outside of the cabinet without being touched by the inner door section when the door is closed. The router is connected to the front face of the cabinet and positioned within the separation distance. The router receives fiber optic components extending out from the front face of the cabinet and directs these fiber optic components to outside of the cabinet.

The present disclosure discloses another embodiment of a frame having a cabinet, a door, and a bracket. The cabinet has an opened front face. The door has a door frame and an inner door section. The door frame is connected to the cabinet to open and close relative to the front face of the cabinet. The bracket connects the inner door section to the door frame such that the inner door section is offset from the front face of the cabinet by a separation distance and covers the front face of the cabinet from the separation distance when the door frame is closed. The bracket has a sufficient length such that the separation distance between the inner door section and the front face of the cabinet when the door frame is closed permits fiber optic components to extend through the front face of the cabinet without being indented by the inner door section.

The advantages of a fiber distribution frame having an offset inner door section and a fiber optic component router for maintaining a minimum bend radius of fiber optic components housed within the fiber distribution frame in accordance with the present disclosure are numerous.

For instance, the inner door section is offset with respect to the cabinet of the fiber distribution frame to provide adequate spacing for fiber optic components running between the inner door section and the cabinet. Because of the adequate spacing, the inner door section does not compress and does not bend the fiber optic components when the door is shut closed with respect to the cabinet of the fiber distribution frame. Accordingly, the offset inner door section permits the fiber optic components to maintain the expected and natural bend radius without being compressed (or crushed) when the door is closed. As a result, the door of the fiber distribution frame does not have to be measured to insure that the spacing is adequate to prevent bending of fiber optic components as done with typical fiber distribution frames.

The fiber optic component router permits an installer to guide and place fiber optic components running between the inner door section and the cabinet directly above, to the side, or below network equipment for suitable jumper routing, protection, and guidance to the fiber management system that supports the bay in which the network equipment is housed. The fiber optic component router is slotted to permit the ability to place and remove fiber optic components at will when necessary; yet properly secures the fiber optic components under extreme conditions up to and including earthquake conditions.

Referring now to FIG. 1, a frontal view of a door 12 of a typical fiber distribution frame 10 is shown. Door 12 is connected on its backside by a hinge 14 to a fiber optic equipment cabinet or chassis 16 (shown in FIG. 2) of fiber distribution frame 10. Hinge 14 mounts door 12 to cabinet 16 for the door to be opened and closed with respect to the cabinet. In the opened position, door 12 uncovers an opened front face of cabinet 16 to allow access to the fiber optic equipment therein. In the closed position, door 12 covers the front face of cabinet 16 to limit access to the fiber optic equipment therein. A faceplate 15 is on the front side of door 12 for identifying fiber distribution frame 10.

Figure 2:
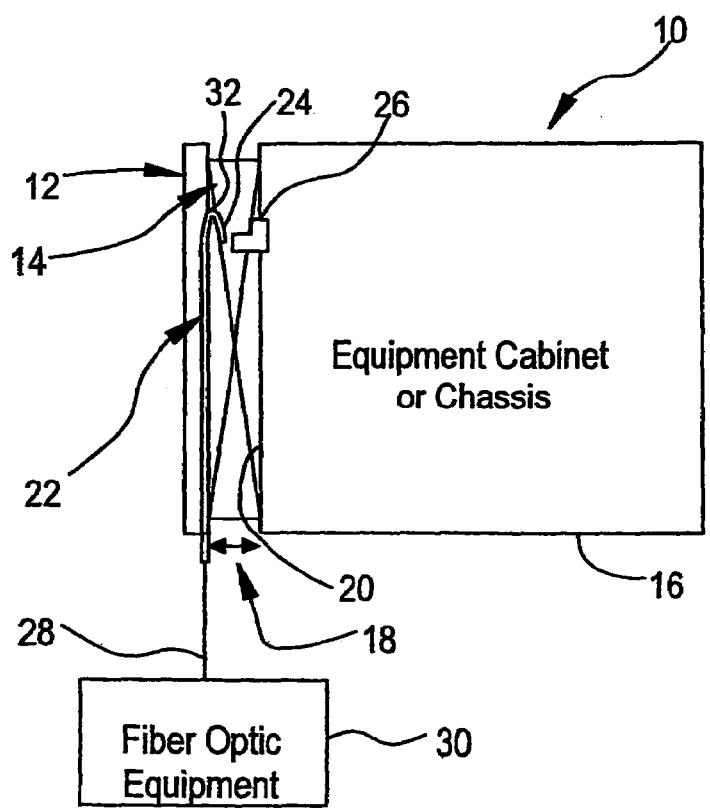
FIG. 2 illustrates a cross-sectional view of the typical fiber distribution frame along the line 2-2' shown in FIG. 1.

Referring now to FIG. 2, with continual reference to FIG. 1, a cross-sectional view of fiber distribution frame 10 along the line 2-2' shown in FIG. 1 is shown. As shown, hinge 14 mounts door 12 to cabinet 16 and the door is shut closed with respect to the cabinet. In the closed position, door 12 is separated from front face 20 of cabinet 16 by a separation distance 18. Separation distance 18 between closed door 12 and cabinet 16 provides space for fiber optic components such as a fiber optic jumper 22 to route and mount to fiber optic equipment within cabinet 16 while door 16 is closed.

That is, separation distance 18 provides a spacing for fiber optic jumper 22 to extend into and out from cabinet 16 while door 12 is closed. One end 24 of fiber optic jumper 22 is connected to fiber optic equipment such as a termination 26 of a fiber optic panel contained in cabinet 16. The other end 28 of fiber optic jumper 22 is connected to fiber optic equipment 30 external to cabinet 16. Fiber optic jumper 22 conducts optical signals between termination 26 contained in cabinet 16 and fiber optic equipment 30.

A disadvantage associated with fiber distribution frame 10 and network equipment is that the spacing between closed door 12 and front face 20 of cabinet 16 provided by separation distance 18 is limited. This limited distance does not provide enough spacing for fiber optic jumper 22 to freely extend in the spacing between closed door 12 and cabinet 16. As a result, the back-side of door 12 touches and contacts fiber optic jumper 22 when the door is shut closed. This contact causes fiber optic jumper 22 to compress and have a bend 32. As shown in FIG. 2, bend 32 of fiber optic jumper 22 is a relatively sharp bend and has a radius less than a minimum bend radius. As such, fiber optic jumper 22 is susceptible to improperly communicating optical signals. The end result is that the signal strength of optical signals communicated by fiber optic jumper 22 may be reduced and that such communicated optical signals may be distorted or noisy.

Figure 3:
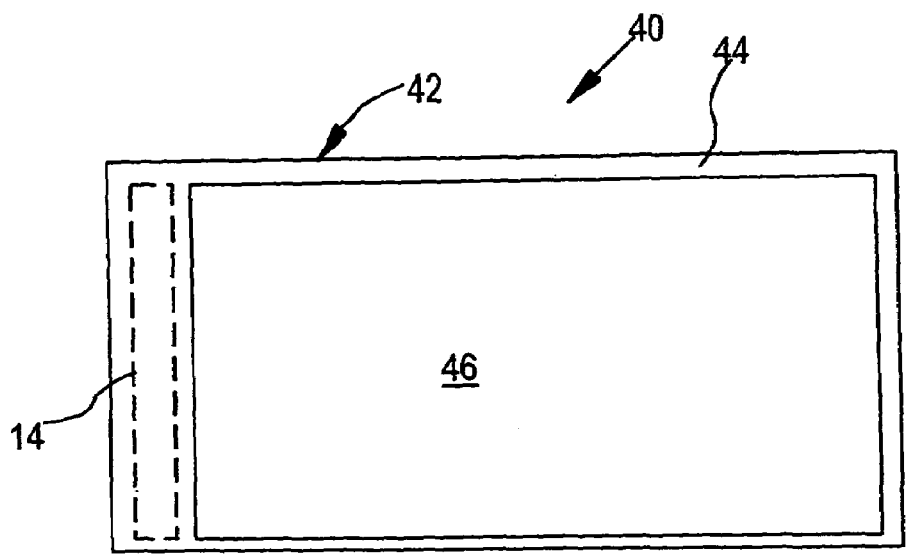
FIG. 3 illustrates a frontal view of the door of a fiber distribution frame in accordance with the present disclosure.

Referring now to FIG. 3, a frontal view of a door 42 of a fiber distribution frame 40 in accordance with the present disclosure is shown. Door 42 is connected on its backside by hinge 14 to chassis 16. Again, hinge 14 mounts door 42 to cabinet 16 for the door to be opened and closed with respect to the cabinet. As shown in FIG. 3, door 42 includes a door frame 44 which surrounds an opened area 46. That is, as shown in FIG. 3, door 42 is formed by a door frame 44 with an inner door section removed from the door. The opened area 46 which exposes front face 20 of cabinet 16 is a result of the inner door section being removed from door 42.

Door 42 is formed by cutting or removing the inner door section from door frame 44 and door hinge 14. The inner door section is then re-attached to door frame 44 using brackets that provide the ability to re-attach the inner door section at an adjustable distance away from front face 20 of cabinet 16.

Figure 4:
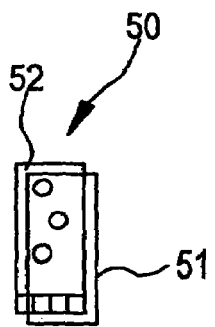
FIG. 4 illustrates a frontal view of an adjustable "L" bracket used with the door of the fiber distribution frame in accordance with the present disclosure.
Figure 5:
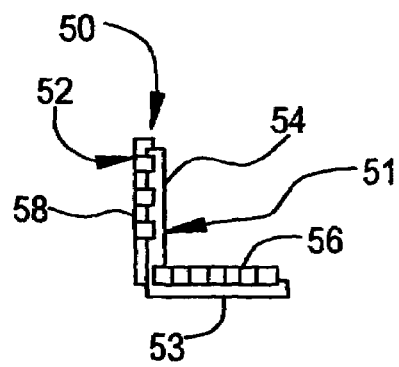
FIG. 5 illustrates a side view of the adjustable "L" bracket.

Referring now to FIGS. 4 and 5, with continual reference to FIG. 3, respective frontal and side views of an adjustable "L" bracket 50 for attaching the inner door section to door frame 44 of fiber distribution frame 40 are shown. A set of brackets 50 are used to re-attach the inner door section to door frame 44 such that the inner door section is offset and separated by an adjustable separation distance from front face 20 of cabinet 16. Bracket 50 is extendible and retractable in order to adjust its length. As such, the separation distance between the inner door section and front face 20 of cabinet 16 is adjustable when brackets 50 attach the inner door section to door frame 44. As described in greater detail below, via the use of brackets 50, the inner door section is attached to and offset from door frame 44 thereby permitting fiber optic jumper 22 to maintain the expected and natural bend radius without being contacted or crushed by the inner door section when door 42 is closed.

Adjustable "L" bracket 50 includes two interconnected "L" bracket components 51 and 52. First bracket component 51 has a first surface 53 and a second surface 54. Second bracket component 52 has a first surface 56 and a second surface 58. In order to re-attach the inner door section to door frame 44, first surface 53 of first bracket component 51 attaches to the inner surface of the inner door section and second surface 58 of second bracket component 52 attaches to door frame 44. First and second bracket components 51 and 52 are inter-connected with one another to be movable with respect to one another in order to adjust the length of bracket 50. The length of bracket 50 is adjusted in order to adjust the separation distance between the inner door section and front face 20 of cabinet 16 when the bracket attaches the inner door section to door frame 44.

When bracket 50 is attached between the inner door section and door frame 44 in the manner described above, the length of bracket 50 is adjustable by moving first bracket component 51 relative to second bracket component 52. In this case, to increase the length of bracket 50, first surface 53 of first bracket component 51 moves away from first surface 56 of second bracket component 52 while second surface 54 of the first bracket component slides away from second surface 58 of the second bracket component. In this case, to decrease the length of bracket 50, first surface 53 of first bracket component 51 moves towards first surface 56 of second bracket component 52 while second surface 54 of the first bracket component slides towards second surface 58 of the second bracket component.

The length of bracket 50 is also adjustable by moving second bracket component 52 relative to first bracket component 51. In this case, to increase and decrease the length, first surface 56 of second bracket component 52 moves away and towards first surface 52 of first bracket component 51 while second surface 58 of the second bracket component slides away and towards second surface 54 of the first bracket component.

Figure 6:
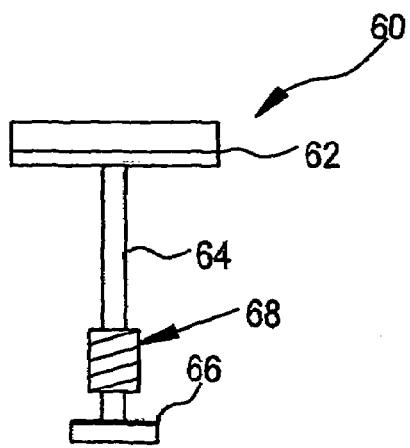
FIG. 6 illustrates a side view of an adjustable "T" fiber optic component router that can accept a varied number of fiber optic jumpers for use with the fiber distribution frame in accordance with the present disclosure.
Figure 7:
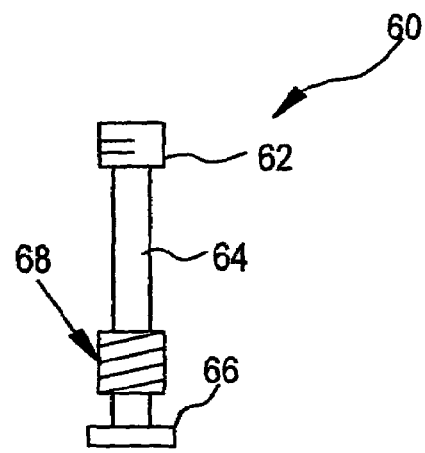
FIG. 7 illustrates a frontal view of the adjustable "T" fiber optic component router that can accept a varied number of fiber optic jumpers.

Referring now to FIGS. 6 and 7, respective side and frontal views of an adjustable "T" fiber optic component router 60 for use with fiber distribution frame 40 is shown. Fiber optic component router 60 is externally mounted via tel-co tape or non-flammable adhesive at the edge of front face 20 of cabinet 16. Fiber optic component router 60 receives fiber optic jumper 22 in order to guide the placement of the fiber optic jumper relative to fiber optic equipment 30 which is external to cabinet 16. Fiber optic component router 60 is adjustable to increase and decrease its length in a range of 1 to 3.25 inches thereby permitting the natural bend radius (1.5 inches) of fiber optic jumper 22 to be maintained.

To this end, fiber optic component router 60 includes a tube 62, a leg 64, and a base 66. Tube 62 receives fiber optic jumpers including fiber optic jumper 22 for placement. Tube 62 or the receptacle for fiber optic jumpers is adjustable to accommodate a number of fiber optic jumpers of varied sizes. Fiber optic component router 60 has a split in the containment material to permit the placement of fiber optic jumpers by providing side pressure to the router thereby opening the containment area for additional fiber optic jumper placement. Leg 64 connects tube 62 to base 66. Fiber optic component router 60 further includes an adjustable sleeve 68. Adjustable sleeve 68 is rotatable to extend and retract the length of leg 64. Leg 64 includes two leg portions which are connected by adjustable sleeve 68. Rotating adjustable sleeve 68 in a clockwise direction causes the two leg portions to come towards each other thereby decreasing the length of leg 64. Similarly, rotating adjustable sleeve 68 in a counter-clockwise direction causes the two leg portions to move away from each other thereby increasing the length of leg 64.

Tube 62 functions as an "eye-of-the-needle" for receiving and placing fiber optic jumper 22. Tube 62 receives fiber optic jumper 22 in order for fiber optic component router 60 to guide the placement of the fiber optic jumper. Adjustable sleeve 68 is rotated in order to set the appropriate length of leg 64 in order to properly guide fiber optic jumper 22 relative to fiber optic equipment 30. When guided by fiber optic component router 60, end 28 of fiber optic jumper 22 enters from the top side of tube 62 and exits from the bottom side of the tube.

Figure 8:
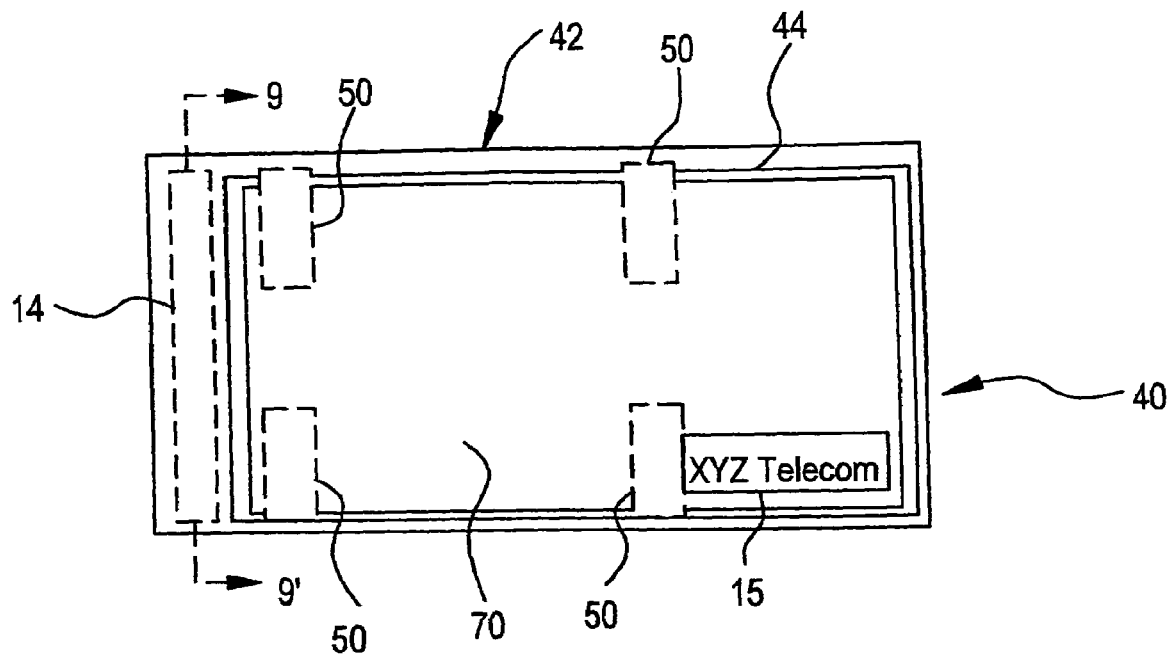
FIG. 8 illustrates a frontal view of the fiber distribution frame in accordance with the present disclosure.

Referring now to FIG. 8, with continual reference to FIGS. 3 through 7, a frontal view of fiber distribution frame 40 is shown. As shown in FIG. 8, four adjustable brackets 50 connect an inner door section 70 of door 42 to door frame 44. For each bracket 50, first surface 53 of first bracket component 51 is connected to the back-side of inner door section and second surface 58 of second bracket component 52 is connected to door frame 44. As a result, inner door section 70 is offset by a separation distance from door frame 44. When door 42 is shut closed, inner door section 70 covers opened front face 20 of cabinet 16 but is offset from the front face of the cabinet.

Figure 9:
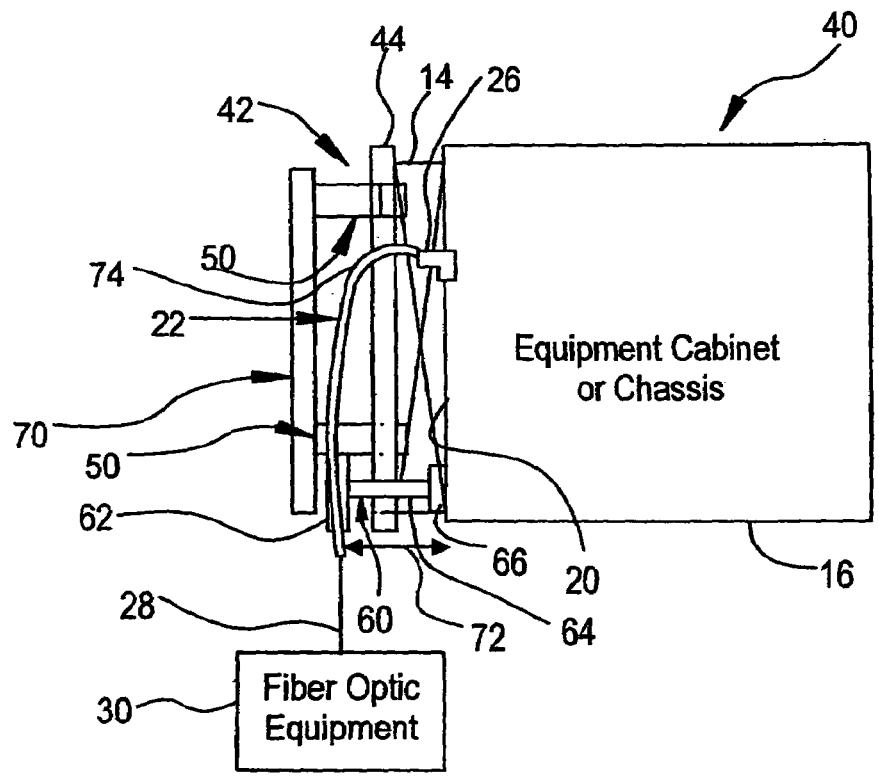
FIG. 9 illustrates a cross-sectional view of the fiber distribution frame in accordance with the present disclosure along the line 9-9' shown in FIG. 8.

Referring now to FIG. 9, with continual reference to FIGS. 1 through 8, a cross-sectional view of fiber distribution frame 40 along the line 9-9' shown in FIG. 8 is shown. As shown, hinge 14 mounts door 42 to cabinet 16 and the door is shut closed with respect to the cabinet. When door 42 is in the closed position, inner door section 70 is separated from front face 20 of cabinet 16 by a separation distance 72. The length of separation distance 72 is a function of the length of brackets 50 which connect the inner door section to door frame 44. The length of brackets 50 are adjusted such that separation distance 72 between inner door section 70 and front face 20 of cabinet 16 is greater than separation distance 18 of typical fiber distribution frame 10. As such, separation distance 72 between inner door section 70 and front face 20 of cabinet 16 provides relatively more space for fiber optic jumper 22 to extend out from the cabinet and mount to fiber optic equipment 30 while door 42 is closed.

As shown in FIG. 9, separation distance 72 provides enough spacing for fiber optic jumper 22 to freely extend between inner door section 70 and front face 20 of cabinet 16. As a result, the back-side of inner door section 70 does not touch or compress fiber optic jumper 22 when door 42 is shut closed. Thus, bend 74 of fiber optic jumper 22 is not compressed and has a radius greater than the minimum bend radius. Accordingly, fiber optic jumper 22 is not susceptible to improperly communicating optical signals.

Fiber optic jumper 22 extends at one end 24 to termination 26 and at the other end 28 to fiber optic equipment 30. End 28 of fiber optic jumper 22 extends through tube 62 of fiber optic component router 60. The length of leg 64 of fiber optic component router 60 is set such that end 28 of fiber optic jumper 22 is positioned properly with respect to fiber optic equipment 30.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A frame comprising:
a cabinet having an opened front face;
a door having a door frame and an inner door section, the door frame being connected to the cabinet for the door to open and close relative to the front face of the cabinet; and
at least one bracket connecting the inner door section to the door frame such that the inner door section is offset from the front face of the cabinet by a separation distance and covers the front face of the cabinet from the separation distance when the door is closed, wherein each bracket has a sufficient length such that the separation distance between the inner door section and the front face of the cabinet when the door is closed permits fiber optic components to extend through the front face of the cabinet without being compressed by the inner door section.

2. The frame of claim 1 wherein:
the length of each bracket is adjustable to adjust the separation distance separating the inner door section from the front face of the cabinet when the door is closed.

3. The frame of claim 2 wherein:
each bracket is an adjustable length "L" bracket having first and second "L" bracket components.

4. The frame of claim 1 further comprising:
a router connected to the front face of the cabinet and positioned within the separation distance between the inner door section and the front face of the cabinet.

5. The frame of claim 4 wherein:
the router includes a tube, a leg, and a base, wherein the base is connected to the front face of the cabinet, and the leg connects the tube to the base.

6. The frame of claim 5 wherein:
the leg is adjustable in length.

7. The frame of claim 6 wherein:
the router further includes an adjustable sleeve connecting two leg portions of the leg;
wherein the adjustable sleeve is rotatable in opposing directions to move the leg portions closer together and farther apart to respectively decrease and increase the length of the leg.

8. The frame of claim 1 wherein:
the fiber optic components are fiber optic jumpers.

9. A frame comprising:
a cabinet having an opened front face;
a door having a door frame and an inner door section, the door frame being connected to the cabinet for the door to open and close relative to the front face of the cabinet, the door frame surrounding an opened area which exposes the front face of the cabinet when the door is closed for fiber optic components to extend out from the front face of the cabinet to outside of the cabinet;
a plurality of brackets connecting the inner door section to the door frame such that the inner door section is offset from the front face of the cabinet by a separation distance and covers the front face of the cabinet from the separation distance when the door is closed, wherein the brackets have a sufficient length such that the separation distance between the inner door section and the front face of the cabinet permits fiber optic components to extend out from the front face of the cabinet to outside of the cabinet without being touched by the inner door section when the door is closed; and
a router connected to the front face of the cabinet and positioned within the separation distance, wherein the router receives fiber optic components extending out from the front face of the cabinet and directs these fiber optic components to outside of the cabinet.

10. The frame of claim 9 wherein:
the length of the brackets are adjustable to adjust the separation distance separating the inner door section from the front face of the cabinet when the door is closed.

11. The frame of claim 10 wherein:
each bracket is an adjustable length "L" bracket having first and second "L" bracket components.

12. The frame of claim 9 wherein:
the router includes a tube, a leg, and a base, wherein the base is connected to the front face of the cabinet, and the leg connects the tube to the base which receives and directs the fiber optic components.

13. The frame of claim 12 wherein:
the leg is adjustable in length.

14. The frame of claim 13 wherein:
the router further includes an adjustable sleeve connecting two leg portions of the leg;
wherein the adjustable sleeve is rotatable in opposing directions to move the leg portions closer together and farther apart to respectively decrease and increase the length of the leg.

15. The frame of claim 9 wherein:
the fiber optic components are fiber optic jumpers.

16. A frame comprising:

a cabinet having an opened front face;

a door having a door frame and an inner door section, the door frame being connected to the cabinet to open and close relative to the front face of the cabinet; and at least one bracket connecting the inner door section to the door frame such that the inner door section is offset from the front face of the cabinet by a separation distance and covers the front face of the cabinet from the separation distance when the door frame is closed, wherein each bracket has a sufficient length such that the separation distance between the inner door section and the front face of the cabinet when the door frame is closed permits fiber optic components to extend through the front face of the cabinet without being indented by the inner door section.

17. The frame of claim 16 wherein:

the length of each bracket is adjustable to adjust the separation distance separating the inner door section from the front face of the cabinet when the door is closed.

18. The frame of claim 16 further comprising:

a router connected to the front face of the cabinet and positioned within the separation distance between the inner door section and the front face of the cabinet.

19. The frame of claim 18 wherein:

the router includes a tube, a leg, and a base, wherein the base is connected to the front face of the cabinet, and the leg connects the tube to the base, wherein the leg is adjustable in length.

20. The frame of claim 19 wherein:

the router further includes an adjustable sleeve connecting two leg portions of the leg;

wherein the adjustable sleeve is rotatable in opposing directions to move the leg portions closer together and farther apart to respectively decrease and increase the length of the leg.

* * * * *